United States Patent
Zhang et al.

(10) Patent No.: US 8,989,392 B2
(45) Date of Patent: Mar. 24, 2015

(54) PHYSICAL LAYER FRAME FORMAT FOR LONG RANGE WLAN

(75) Inventors: Hongyuan Zhang, Fremont, CA (US); Yong Liu, Campbell, CA (US); Raja Banerjea, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 7 days.

(21) Appl. No.: 13/491,527

(22) Filed: Jun. 7, 2012

(65) Prior Publication Data

US 2012/0314869 A1  Dec. 13, 2012

Related U.S. Application Data

(60) Provisional application No. 61/494,362, filed on Jun. 7, 2011.

(51) Int. Cl.
*H04J 3/18* (2006.01)
*H04W 28/06* (2009.01)

(52) U.S. Cl.
CPC .................................. *H04W 28/06* (2013.01)
USPC ........... 380/287; 370/474; 370/475; 370/476; 370/477; 714/758; 714/776

(58) Field of Classification Search
USPC .................... 370/474–477; 714/758
See application file for complete search history.

(56) References Cited

U.S. PATENT DOCUMENTS

| | | | | |
|---|---|---|---|---|
| 6,988,236 | B2 * | 1/2006 | Ptasinski et al. | 714/758 |
| 7,162,682 | B2 * | 1/2007 | Lewis | 714/776 |
| 7,865,802 | B1 * | 1/2011 | Feng et al. | 714/758 |
| 8,151,305 | B2 * | 4/2012 | Doerr et al. | 725/62 |
| 2006/0268671 | A1 * | 11/2006 | Coon | 370/203 |
| 2007/0081532 | A1 * | 4/2007 | Kim et al. | 370/389 |
| 2009/0196163 | A1 | 8/2009 | Du | |
| 2010/0046656 | A1 | 2/2010 | van Nee et al. | |
| 2010/0054223 | A1 * | 3/2010 | Zhang et al. | 370/338 |
| 2011/0199971 | A1 * | 8/2011 | Kim et al. | 370/328 |
| 2011/0286378 | A1 * | 11/2011 | Kim et al. | 370/312 |
| 2012/0195391 | A1 | 8/2012 | Zhang et al. | |
| 2012/0201316 | A1 | 8/2012 | Zhang et al. | |
| 2012/0294294 | A1 | 11/2012 | Zhang | |
| 2012/0300874 | A1 | 11/2012 | Zhang | |

FOREIGN PATENT DOCUMENTS

WO    WO-2012-122119 A1    9/2012

OTHER PUBLICATIONS

International Search Report for International Application No. PCT/US2012/041422, dated Jan. 2, 2013.
Written Opinion for International Application No. PCT/US2012/041422, dated Jan. 2, 2013.

(Continued)

*Primary Examiner* — Dede Zecher
*Assistant Examiner* — Richard McCoy

(57) ABSTRACT

A preamble portion of a physical layer (PHY) data unit is generated for transmission via a long range communication protocol. A service field is generated with a length of eight or less bits. A data portion of the PHY data unit is generated to include the service field having the length of eight bits or less.

8 Claims, 13 Drawing Sheets

(56) References Cited

OTHER PUBLICATIONS

IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 Ghz Band," *The Institute of Electrical and Electronics Engineers, Inc.*, (1999) Reaffirmed Jun. 12, 2003.

Chen, "Home Network Basis: Transmission Environments and Wired/Wireless Protocols," Section 10.4 Complementary Code Keying, Prentice Hall (Jul. 2003).

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHZ Band," *The Institute of Electrical and Electronics Engineers, Inc.*, 1999.

IEEE Std 802.11b-1999/Cor 1-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band—Corrigendum 1," *The Institute of Electrical and Electronics Engineers, Inc.*, Nov. 7, 2001.

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

IEEE Std P802.11-REVma/06.0, "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications. (This document reflects the combining of the 2003 Edition of 802.11 plus the 802.11 h, 802.11 i and 802.11j Amendments) (Revision of IEEE Std 802.11-1999) (Superseded by P802.11-REVma_D7.0)," 2006.

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

Hiertz, et al., "The IEEE 802.11 Universe," IEEE Communications Magazine, pp. 62-70, Jan. 2010.

S. A. Mujtaba, "IEEE P802.11—Wireless LANs, TGn Sync Proposal Technical Specification," *The Institute of Electrical and Electronics Engineers, Inc.*, doc.: IEEE 802.11—04/0889r6, May 2005.

"IEEE P802.11n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

"IEEE Std. 802.11n™ IEEE Standard for Information Technology—Telecommunications and information exchange between systems—Local and metropolitan area networks-Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

van Nee, et al. "The 802.11n MIMO—OFDM Standard for Wireless LAN and Beyond," Wireless Personal Communications, vol. 37, pp. 445-453 (Jun. 2006).

Stacey et al., "IEEE P802.11, Wireless LANs, Proposed TGac Draft Amendment," Institute of Electrical and Electronics Engineers, doc. No. IEEE 802.11-10/1361r3 (Jan. 2011).

Stacey et al., "Specification Framework for TGac," document No. IEEE 802.11-09/0992r20, *Institute for Electrical and Electronics Engineers*, pp. 1-49, Jan. 18, 2011.

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jan. 2012.

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Mar. 2012.

Perahia, et al., "Gigabit Wireless LANs: an overview of IEEE 802.11ac and 80211ad," ACM SIGMOBILE Mobile Computing and Communications Review, vo. 15, No. 3, pp. 23-33, Jul. 2011.

Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), *The Institute of Electrical and Electronics Engineers*, pp. 207-211 (2009).

Imashioya et al., "RTL Design of 1.2 Gbps MIMO WLAN System and Its Business Aspect," IEEE 9th Int'l Symposium on Communications and Information Technology (ISCIT 2009), *The Institute of Electrical and Electronics Engineers*, pp. 296-301 (2009).

Syafei et al., "A Design of Next Generation Gigabit MIMO Wireless LAN System," IEEE 12th Int'l Conference on Advanced Communication Technology (ICACT 2010), *The Institute of Electrical and Electronics Engineers*, pp. 941-946 (2010).

Syafei et al., "A Gigabit MIMO WLAN System with International Standardization Strategy," IEEE Int'l Symposium on Intelligent Signal Processing and Communication Systems (ISPACS 2009), *The Institute of Electrical and Electronics Engineers*, pp. 228-231 (2009).

Shi et al., "Phase Tracking During VHT-LTF," Doc. No. IEEE 802.11-10/0771r0, *The Institute of Electrical and Electronics Engineers, Inc.*, Jul. 2010.

van Zelst et al., "Pilot Sequence for VHT-DATA," Doc. No. IEEE 802.11-10/0811r1, *The Institute of Electrical and Electronics Engineers, Inc.*, Jul. 2010.

IEEE Std 802.11af/D1.05 "Draft Standard for Information Technology—Telecommunications and information exchange between systems—Local and metropolitan area networks—Specific requirements, Part 11: Wireless Lan Medium Access Control (MAC) and

(56) References Cited

OTHER PUBLICATIONS

Physical Layer (PHY) specifications: Amendment 4: TV White Spaces Operation," *The Institute of Electrical and Electronics Engineers, Inc.*, Nov. 2011.

Yu, et al. "Coverage extension for IEEE802.11ah," *The Institute of Electrical and Electronics Engineers*, doc. No. IEEE 802.11-11/0035r1, (Jan. 2011).

Taghavi et al., "Introductory Submission for TGah", doc. No. IEEE 802.11-11/0062r0, *Institute for Electrical and Electronics Engineers*, pp. 1-5 (Jan. 14, 2011).

de Vegt, "Potential Compromise for 802.11ah Use Case Document", Institute of Electrical and Electronics Engineers, doc. No. IEEE 802.11-11/0457r0, (Mar. 2011).

Park, "Proposed Specification Framework for TGah", *The Institute of Electrical and Electronics Engineers*, doc. No. IEEE 802.11-11/1137r6, (Mar. 2012).

Vermani, et al. "Preamble Format for 1 MHz," *The Institute of Electrical and Electronics Engineers*, doc. No. IEEE 802.11-11/1482r2, (Nov. 2011).

Zhang et al., "1MHz Waveform in Wider BW", *The Institute of Electrical and Electronics Engineers*, doc. No. IEEE 802.11-12/0309r1, (Mar. 2012).

Vermani, et al. "Spec Framework Text for PHY Numerology," *The Institute of Electrical and Electronics Engineers*, doc. No. IEEE 802.11-11/1311r0, (Sep. 2011).

Park, "Proposed Specification Framework for TGah", *The Institute of Electrical and Electronics Engineers*, doc. No. IEEE 802.11-11/1137r11, (Sep. 2012).

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

International Preliminary Examination Report in corresponding PCT/US2012/041422, mailed Dec. 27, 2013.

U.S. Appl. No. 61/437,270, filed Jan. 28, 2011, entitled "PHY Layer of 11ah for WLAN Range Extension".

U.S. Appl. No. 61/437,506, filed Jan. 28, 2011, entitled "Preamble of 11ah for WLAN Range Extension".

U.S. Appl. No. 61/486,713, filed May 16, 2011, entitled "11ah and 11af Preamble Design for Optional MUMIMO".

U.S. Appl. No. 61/480,238, filed Apr. 28, 2011, entitled "11ah OFDM Low Rate PHY".

EPO Communication pursuant to Article 94(3) EPC for European Application No. 12 730 296.6-1854, dated Jan. 16, 2015 (6 pages).

* cited by examiner

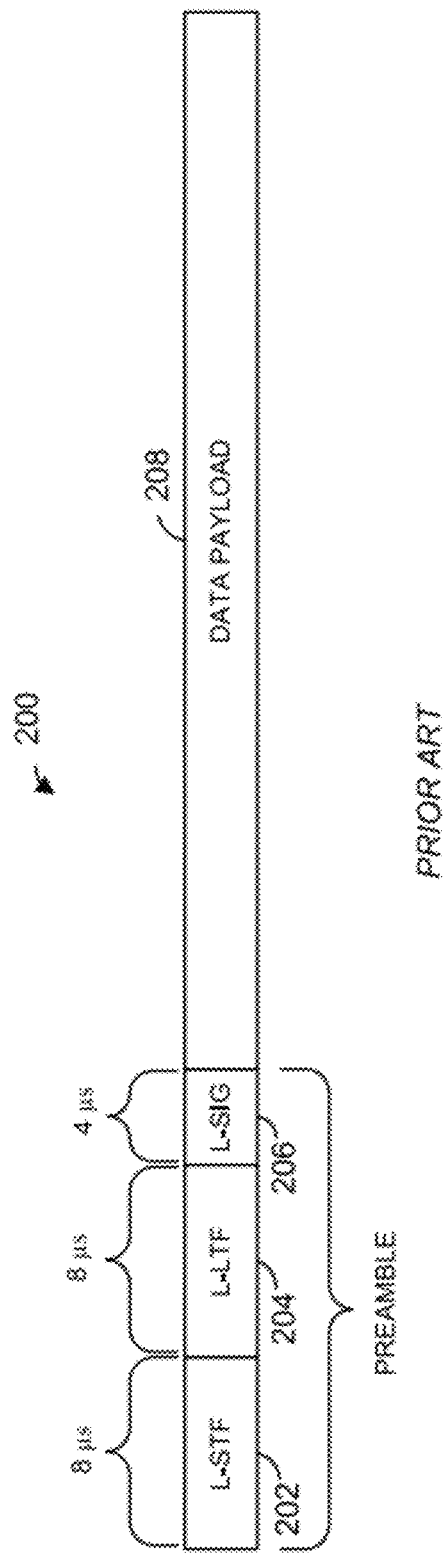
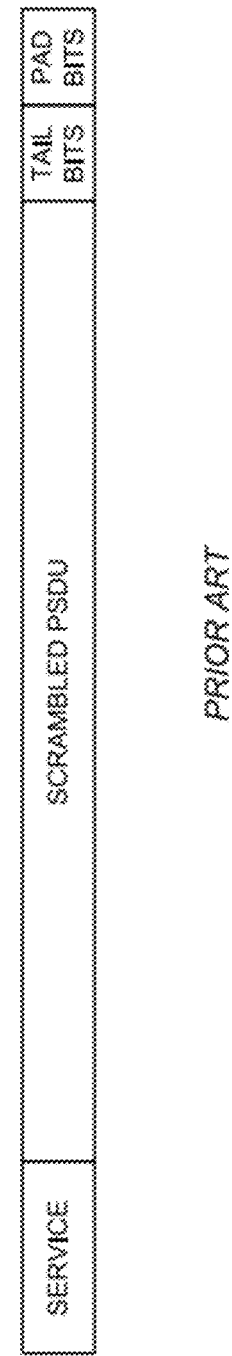
FIG. 2A  PRIOR ART
FIG. 2B  PRIOR ART

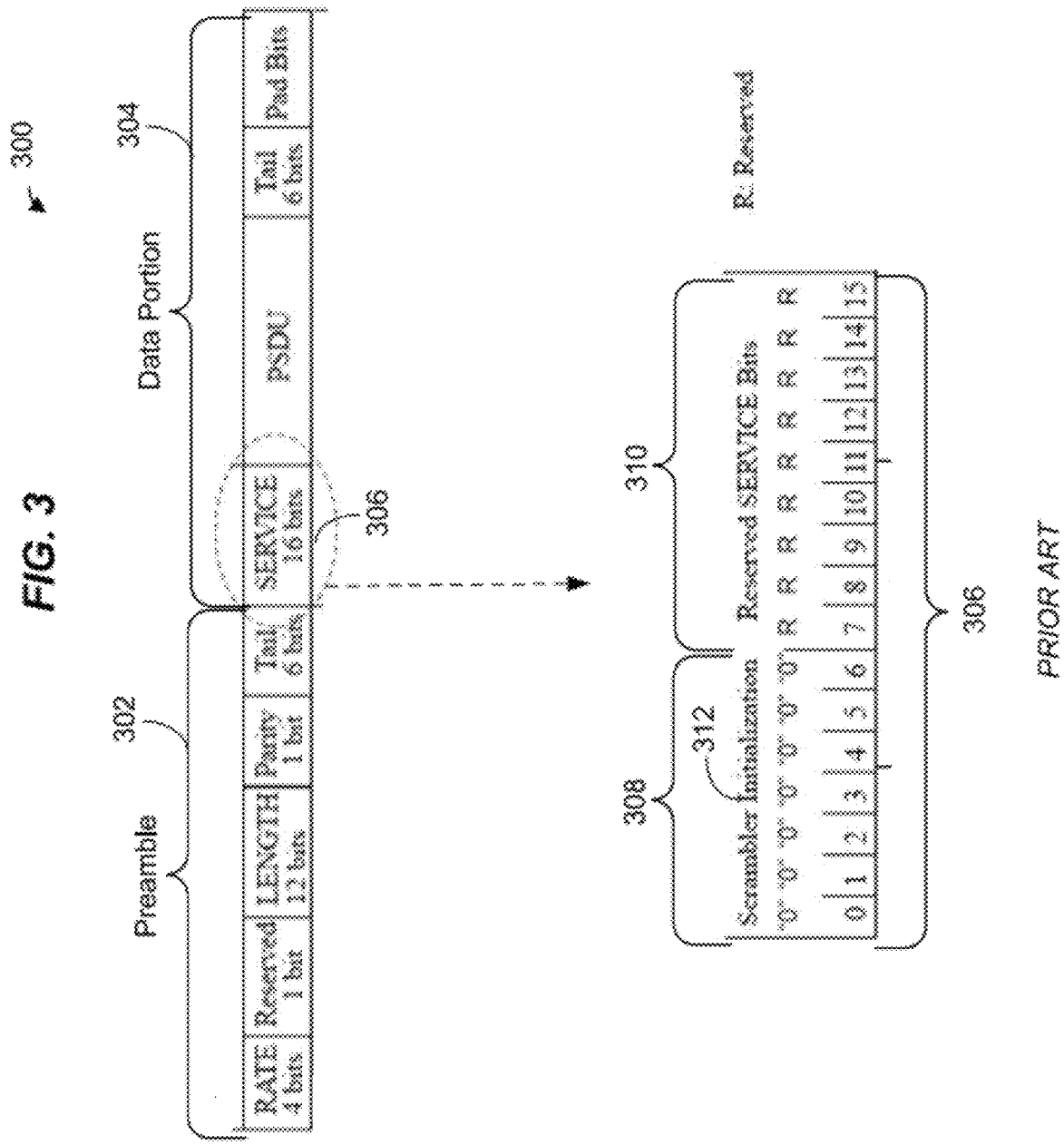

PHYSICAL LAYER FRAME FORMAT FOR LONG RANGE WLAN

CROSS-REFERENCE TO RELATED APPLICATION

This disclosure claims the benefit of U.S. Provisional Patent Application No. 61/494,362, entitled "Remove SERVICE Field in 11ah and 11af," filed on Jun. 7, 2011, the disclosure of which is hereby incorporated by reference herein in its entirety.

FIELD OF THE DISCLOSURE

The present disclosure relates generally to communication networks and, more particularly, to long range low power wireless local area networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range.

Work has begun on two new standards, IEEE 802.11ah and IEEE 802.11af, each of which will specify wireless network operation in sub-1 GHz frequencies. Lower frequency communication channels are generally characterized by better propagation qualities and extended propagation ranges compared to transmission at higher frequencies. In the past, sub-1 GHz ranges have not been utilized for wireless communication networks because such frequencies were reserved for other applications (e.g., licensed TV frequency bands, radio frequency band, etc.). There are few frequency bands in the sub 1-GHz range that remain unlicensed, with different specific unlicensed frequencies in different geographical regions. The IEEE 802.11ah Standard will specify wireless operation in available unlicensed sub-1 GHz frequency bands. The IEEE 802.11af Standard will specify wireless operation in TV White Space (TVWS), i.e., unused TV channels in sub-1 GHz frequency bands. Communications channels in the sub-1 GHz frequency bands have a lower data rate, therefore generating a physical layer (PHY) data unit with a long preamble will significantly increase the duration of time it takes to transmit the data unit to the client station.

SUMMARY OF THE DISCLOSURE

In one embodiment, a method for generating a physical layer (PHY) data unit for transmission via a long range communication protocol includes generating a preamble portion of the PHY data unit. The method also includes generating a service field, wherein the service field has a length of eight or less bits. The method further includes generating a data portion of the PHY data unit to include the service field having the length of eight bits or less.

In various other embodiments, any combination of the following features are included. Seven bits of the service field correspond to a scrambler seed, and one bit of the service field corresponds to a reserved field. The service field includes a scrambler seed subfield, and a length of the scrambler seed subfield is less than a length of a scrambler seed utilized to scramble data in the data portion of the PHY data unit. One or more bits of the scrambler seed not included in the scrambler seed subfield are assumed to have a predefined value.

In another embodiment, an apparatus comprises a network interface configured to generate a PHY data unit according to a long range communication protocol. The network interface is also configured to at least generate a preamble portion of the PHY data unit and to generate a service field, wherein the service field has a length of eight or less bits. The network interface is further configured to generate a data portion of the PHY data unit to include the service field having the length of eight bits or less.

In various other embodiments, any combination of the following features are included. Seven bits of the service field correspond to a scrambler seed, and one bit of the service field corresponds to a reserved field. The service field includes a scrambler seed subfield, and a length of the scrambler seed subfield is less than a length of a scrambler seed utilized to scramble data in the data portion of the PHY data unit. One or more bits of the scrambler seed not included in the scrambler seed subfield are assumed to have a predefined value.

In still another embodiment, a method for generating a physical layer (PHY) data unit for transmission via a long range communication protocol includes generating a scrambler seed subfield. The method also includes generating a signal field that includes the scrambler seed subfield. The method further includes generating a preamble portion of the PHY data unit, wherein the preamble portion includes the signal field. The method still further includes generating a data portion of the PHY data unit, wherein the data portion omits a service field.

In various other embodiments, any combination of the following features are included. The scrambler seed subfield has a length of seven bits. A length of the scrambler seed subfield is less than a length of a scrambler seed utilized to scramble data in the data portion of the PHY data unit. One or more bits of the scrambler seed not included in the scrambler seed subfield are assumed to have a predefined value.

In another embodiment, an apparatus comprises a network interface configured to generate a physical layer (PHY) data unit according to a long range communication protocol. The apparatus is also configured to at least generate a scrambler seed subfield, to generate a signal field that includes the scrambler seed subfield. The apparatus is further configured to generate a preamble portion of the PHY data unit, wherein the preamble portion includes the signal field. The apparatus is still further configured to generate a data portion of the PHY data unit, wherein the data portion omits a service field.

In various other embodiments, any combination of the following features are included. The scrambler seed subfield has a length of seven bits. A length of the scrambler seed subfield is less than a length of a scrambler seed utilized to scramble data in the data portion of the PHY data unit. One or more bits of the scrambler seed not included in the scrambler seed subfield are assumed to have a predefined value.

In still another embodiment, a method for generating a physical layer (PHY) data unit for transmission via a long range communication protocol includes determining whether the PHY data unit is to be generated according to a first mode of operation or a second mode of operation. The method also includes generating the PHY data unit such that a scrambler seed subfield (i) is at a first location in the PHY data unit and (ii) has a first length, when it is determined that the PHY data unit is to be generated according to the first mode of operation. The method further includes generating the PHY data unit such that at least one of (i) the scrambler seed subfield is at a second location in the PHY data unit different than the first location, and (ii) the scrambler seed subfield has a second length different than the first length, when it is determined that the PHY data unit is to be generated according to the second mode of operation.

In various other embodiments, any combination of the following features are included.

When it is determined that the PHY data unit is to be generated according to the first mode of operation, the method generates the PHY data unit such that the scrambler seed subfield is in a service field of a data portion of the PHY data unit, and when it is determined that the PHY data unit is to be generated according to the second mode of operation, the method generates the PHY data unit such that the scrambler seed subfield is in a signal field of a preamble portion of the PHY data unit.

When it is determined that the PHY data unit is to be generated according to the first mode of operation, the method generates the PHY data unit such that the scrambler seed subfield has a first length, and when it is determined that the PHY data unit is to be generated according to the second mode of operation, the method generates the PHY data unit such that the scrambler seed subfield has a second length shorter than the first length.

In still another embodiment, an apparatus comprises a network interface configured to generate a physical layer (PHY) data unit according to a long range communication protocol. The network interface is further configured to at least determine whether the PHY data unit is to be generated according to a first mode of operation or a second mode of operation. The network interface is also configured to generate the PHY data unit such that a scrambler seed subfield (i) is at a first location in the PHY data unit and (ii) has a first length, when it is determined that the PHY data unit is to be generated according to the first mode of operation. The network interface is still further configured to generate the PHY data unit such that at least one of (i) the scrambler seed subfield is at a second location in the PHY data unit different than the first location, and (ii) the scrambler seed subfield has a second length different than the first length, when it is determined that the PHY data unit is to be generated according to the second mode of operation.

In various other embodiments, any combination of the following features are included.

The network interface is further configured to generate the PHY data unit such that the scrambler seed subfield is in a service field of a data portion of the PHY data unit, when it is determined that the PHY data unit is to be generated according to the first mode of operation, and to generate the PHY data unit such that the scrambler seed subfield is in a signal field of a preamble portion of the PHY data unit, when it is determined that the PHY data unit is to be generated according to the second mode of operation.

The network interface is further configured to generate the PHY data unit such that the scrambler seed subfield has a first length, when it is determined that the PHY data unit is to be generated according to the first mode of operation, and to generate the PHY data unit such that the scrambler seed subfield has a second length shorter than the first length, when it is determined that the PHY data unit is to be generated according to the second mode of operation.

BRIEF DESCRIPTION OF THE DRAWINGS

FIGS. 2A and 2B are diagrams of a short range orthogonal frequency division multiplexing (OFDM) data unit, according to an embodiment.

FIG. 3 is a diagram of a data unit format as defined by the IEEE 802.11a/802.11g Standard.

DETAILED DESCRIPTION

Figure 1:
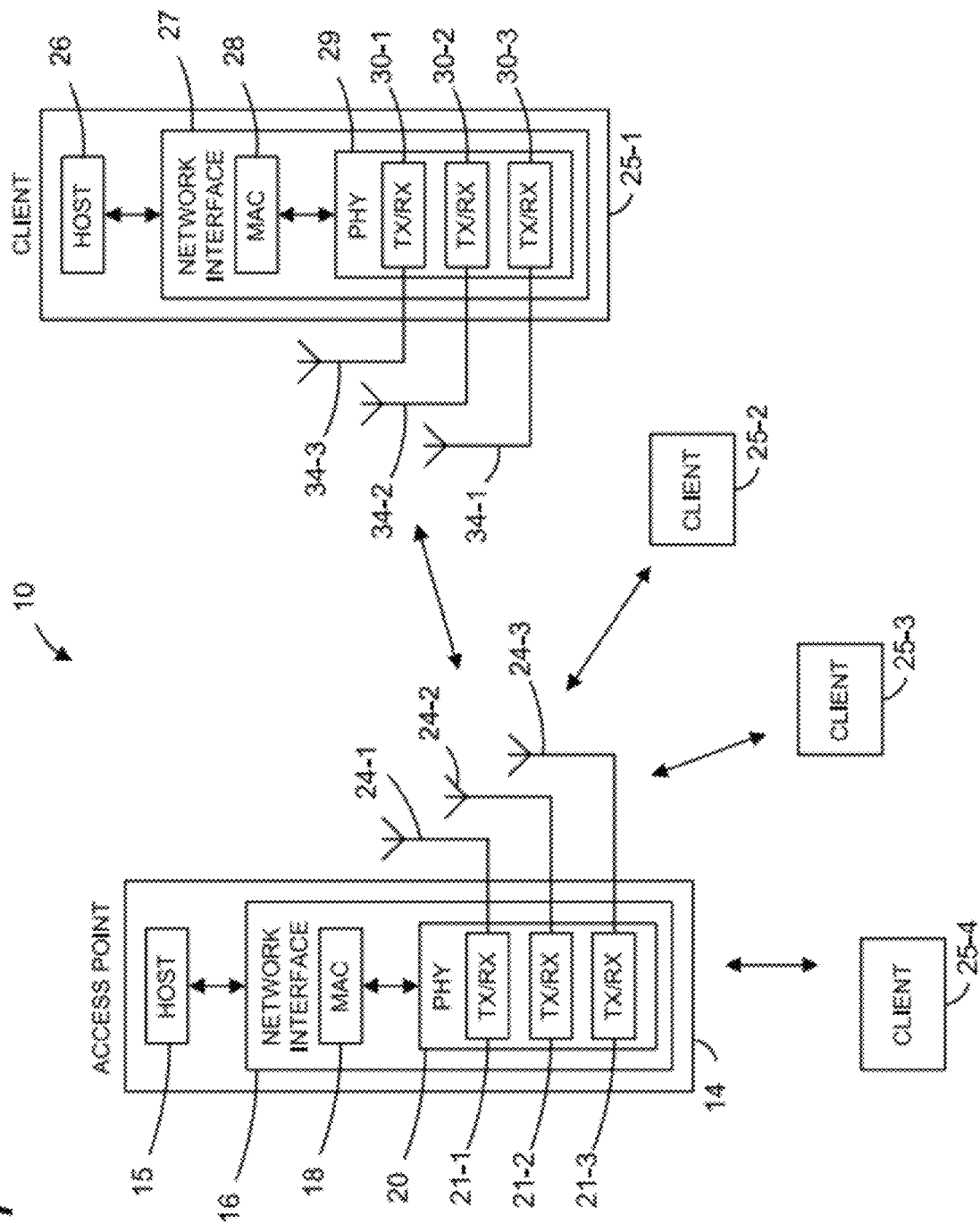
FIG. 1 is a block diagram of an example wireless local area network (WLAN) 10, according to an embodiment.

In embodiments described below, a wireless network device such as an access point (AP) of a wireless local area network (WLAN) transmits data streams to one or more client stations. The AP is configured to operate with client stations according to at least a first communication protocol. The first communication protocol defines operation in a sub 1 GHz frequency range, and is typically used for applications requiring long range wireless communication with relatively low data rates. The first communication protocol (e.g., as specified in the IEEE 802.11 of Standard or the IEEE 802.11 ah Standard) is referred to herein as a "long range" communication protocol. In some embodiments, the AP is also configured to operate with client stations according to one or more other communication protocols which define operation in generally higher frequency ranges and are typically used for communication in closer ranges and with generally higher data rates. The closer range communication protocols are collectively referred to herein as "short range" communication protocols.

In some embodiments, the long range communication protocol defines one or more physical layer data unit formats the same as or similar to physical layer data unit format defined by one or more of the short range communication protocols. In one embodiment, to support communication over a longer range, and also to accommodate typically smaller bandwidth channels available at lower (sub 1-GHz) frequencies, the long range communication protocol defines physical layer (PHY)

data units having a format that is similar to a PHY data unit format defined by a long range communication protocol, but generated using a lower clock rate. In an embodiment, the AP operates at a clock rate suitable for short range (and high throughput) operation, and down-clocking is used to generate a new clock signal to be used for the sub 1 GHz operation. As a result, in this embodiment, a PHY data unit that conforms to the long range communication protocol ("long range data unit") maintains a physical layer format of a data unit that is similar to a short range communication protocol ("short range data unit"), but is transmitted over a longer period of time. Additionally, in some embodiments, the long range communication protocol defines one or more additional communication modes having even lower data rates and intended for extended range operations.

In some embodiments, because the long range data units are transmitted at a slower rate than short range data units and because the overall length of PHY data units is sometimes limited, the degree of overhead caused by PHY preamble information and other PHY overhead information in the long range data units is much greater as compared to the degree of overhead caused by such information in the short range data units. For example, a service field is included in PHY data units that conform to the IEEE 802.11a, 802.11g, and 802.11n Standards. As specified in the IEEE 802.11a, 802.11g, and 802.11n Standards, the service field has a length of two bytes. In some expected use scenarios of long range communication protocols, the payload of a PHY data unit may be on the order of two bytes. Thus, a service field as specified in the IEEE 802.11a, 802.11g, and 802.11n Standards contributes significantly to overhead in a long range communication protocol, at least in some scenarios.

In embodiments described below, example PHY data unit formats are described in which a service field, such as specified in the IEEE 11a, 802.11g, and 802.11n Standards, is significantly reduced in size or removed altogether to reduce overhead when using a long range protocol.

FIG. 1 is a block diagram of an example wireless local area network (WLAN) 10, according to an embodiment. An AP 14 includes a host processor 15 coupled to a network interface 16. The network interface 16 includes a medium access control (MAC) unit 18 and a physical layer (PHY) unit 20. The PHY unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments.

The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. At least one of the client stations 25 (e.g., client station 25-1) is configured to operate at least according to the long range communication protocol. In some embodiments, at least one of the client stations 25 (e.g., client station 25-4) is a short range client station that is configured to operate according to one or more of the short range communication protocols.

The client station 25-1 includes a host processor 26 coupled to a network interface 27. The network interface 27 includes a MAC unit 28 and a PHY unit 29. The PHY unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In an embodiment, one or both of the client stations 25-2 and 25-3, has a structure the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

In various embodiments, the PITY unit 20 of the AP 14 is configured to generate data units conforming to the long range communication protocol and having formats described hereinafter. The transceiver(s) 21 is/are configured to transmit the generated data units via the antenna(s) 24. Similarly, the transceiver(s) 24 is/are configured to receive the data units via the antenna(s) 24. The PHY unit 20 of the AP 14 is configured to process received data units conforming to the long range communication protocol and having formats described hereinafter, according to various embodiments.

In various embodiments, the PHY unit 29 of the client device 25-1 is configured to generate data units conforming to the long range communication protocol and having formats described hereinafter. The transceiver(s) 30 is/are configured to transmit the generated data units via the antenna(s) 34. Similarly, the transceiver(s) 30 is/are configured to receive data units via the antenna(s) 34. The PHY unit 29 of the client device 25-1 is configured to process received data units conforming to the long range communication protocol and having formats described hereinafter, according to various embodiments.

A brief description of prior art PHY data unit formats is provided below as background.

FIG. 2A is a diagram of a prior art short range PHY data unit 200 specified by the IEEE 802.11a Standard. The PHY data unit 200 includes a preamble having a legacy short training field (L-STF) 202, generally used for packet detection, initial synchronization, and automatic gain control, etc., and a legacy long training field (L-LTF) 204, generally used for channel estimation and fine synchronization. The PHY data unit 200 also includes a legacy signal field (L-SIG) 206, used to carry certain physical layer (PHY) parameters of with the data unit 200, such as modulation type and coding rate used to transmit the PHY data unit 200, for example. The PHY data unit 200 also includes a data portion 208. FIG. 2B is a diagram of example data portion 208 (not low density parity check encoded), which includes a service field, a scrambled physical layer service data unit (PSDU), tail bits, and padding bits, if needed. The PHY data unit 200 is designed for transmission over one spatial or space-time stream in single input a single output (SISO) channel configuration.

FIG. 3 is a diagram of a prior art short range PHY data unit 300 specified by the IEEE 802.11a and 802.11g Standards. The data unit 300 includes a preamble 302 and a data portion 304. The data portion 304 includes a service field 306. The service field 306 has a length of sixteen bits (two bytes). The seven most significant bits (MSB) are defined as scrambler seed bits 308, and the nine least significant bits are reserved service bits 310. The service field 306 is generally used to define an initial state of a scrambler used to scramble information bits in the data portion 304 for purposes of improving reception of the data portion 304. The PHY data unit 300 is designed for transmission over one spatial or space-time stream in a single input, single output (SISO) channel configuration.

Figure 4:
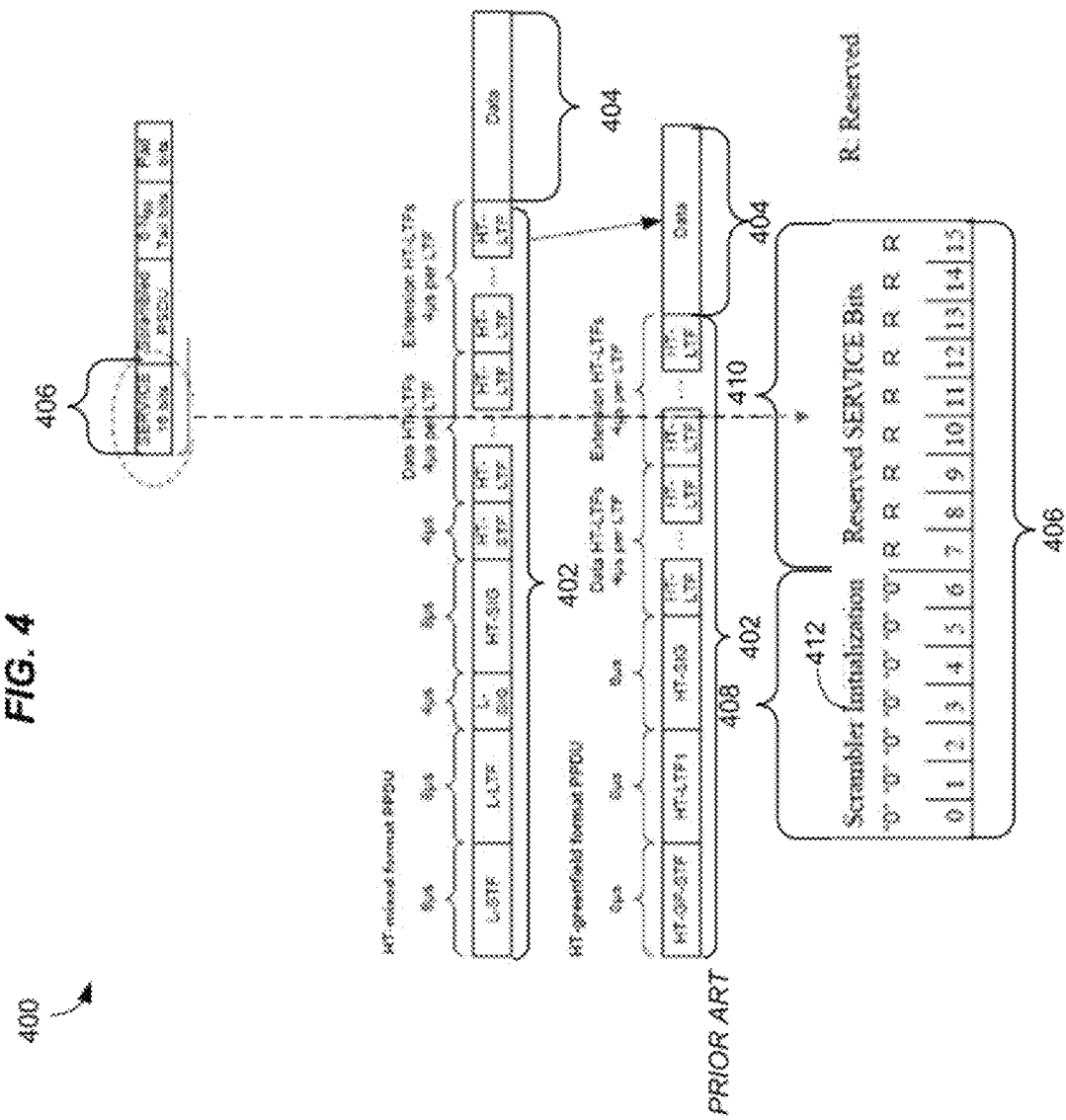
FIG. 4 is a diagram of a data unit format as defined by the IEEE 802.11n Standard.

FIG. 4 is a diagram of two prior art PHY data units 400 according to the IEEE 802.11n Standard. The data units 400 includes a preamble 402 and a data portion 404. The data portion 404 includes a service field 406. The service field has a length of sixteen bits. The seven most significant bits (MSB) are defined as scrambler seed bits 408, and the nine least significant bits (LSB) are reserved service bits 410. The PHY data units 400 are designed for transmission over one or more spatial or space-time streams in a multiple user multiple input multiple output (MIMO) channel configuration.

Figure 5:
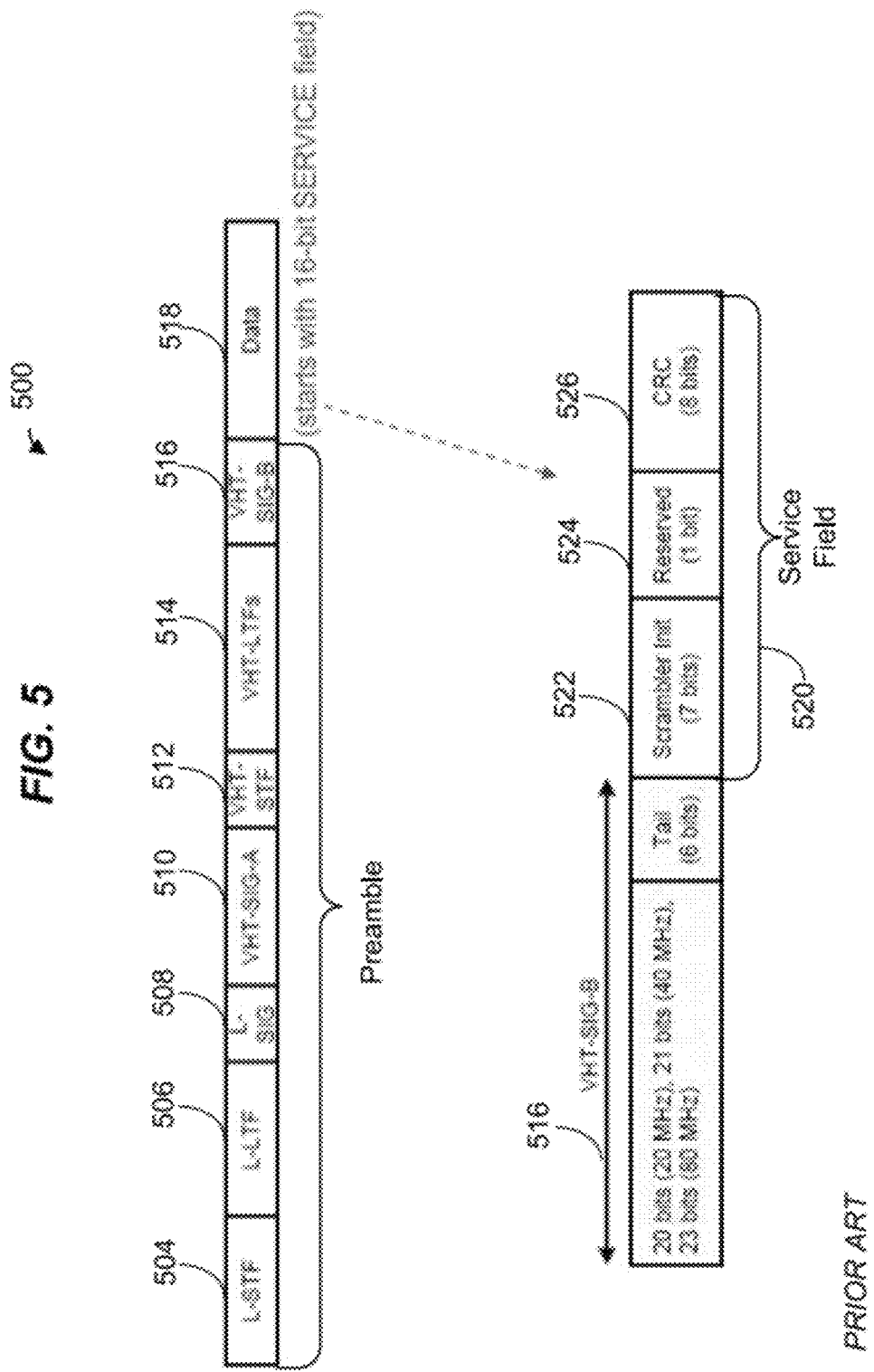
FIG. 5 is a diagram of a data unit format as defined by the IEEE 802.11ac Standard, now being developed.

FIG. 5 is a diagram of a prior art PHY data unit 500 according to the IEEE 802.11ac Standard, which is in the process of being standardized. The PHY data unit 500 includes a preamble 502 having a legacy short training field (L-STF) 504, legacy long training field (L-LTF) 506 and a legacy signal (L-SIG) 508 for providing at least some information to legacy stations (e.g., client stations configured to communicate according to the IEEE 802.11a, the IEEE 802.11g, or the IEEE 802.11n Standards).

The data unit 500 is designed for transmission in a multiple user, multiple input multiple output (MIMO) channel configuration. The preamble 502 includes a very high throughput (VHT) signal field A (VHT-SIG-A) 510 that specifies information regarding the PHY data unit 500. The preamble 502 also includes a VHT short training field (VHT-STF) 512, generally used for packet detection, initial synchronization, and automatic gain control, etc., a VHT long training fields (VHT LTF) 514, generally used for channel estimation and fine synchronization, and a very high throughput signal field B (VHT-SIG-B) 516. The PHY data unit 500 also includes a data portion 518 with a service field 520. The service field 520 has a length of sixteen bits (two bytes). The seven most significant bits (MSB) are defined as scrambler seed bits 522. One bit of the service field is defined as a reserve service bit 524. The eight least significant bits (LSB) of the service field are used as a cyclic redundancy check (CRC) field 526 for the VHT-SIG-B 516.

Figure 6:
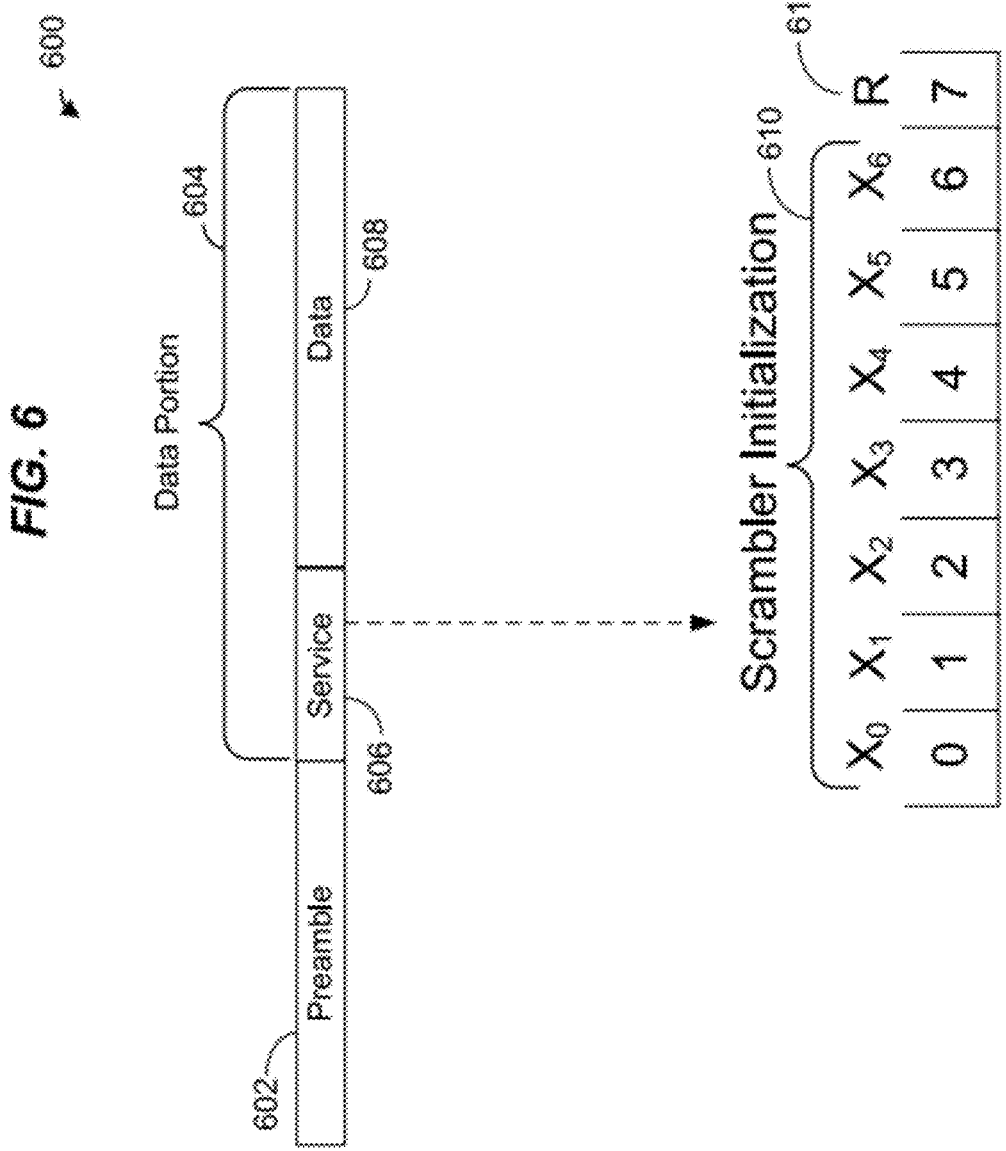
FIG. 6 is a diagram of an example long range physical layer (PHY) data unit, according to an embodiment.

FIG. 6 is a diagram of an example PHY data unit format 600 for use in a long range communication protocol, according to an embodiment. The AP 14 is configured to transmit the PHY data unit 600 to the client station 25-4 via orthogonal frequency division multiplexing (OFDM) modulation, according to an embodiment. In an embodiment, the client station 25-4 is also configured to transmit the data unit 600 to the AP 14.

The PHY data unit 600 includes a preamble 602, generally used for packet detection, synchronization, and automatic gain control, etc., as well as to provide PHY information for use in decoding the data unit. The PHY data unit 600 also includes a data field 604 having a service field 606 and a data portion 608. The service field 606 includes a scrambler seed 610. The scrambler seed 610 has seven bits (e.g., $X_0 \ldots X_6$), in an embodiment. The scrambler seed 610 conforms to the IEEE 802.11 a, b, g, n Standards requiring the scrambler seed to be a non-zero pseudo random value, in an embodiment. The scrambler seed 610 corresponds to an initial state of a scrambler used to scramble bits in the data portion 608.

In an embodiment, the seven most significant bits (MSBs) of the service field 606 correspond to the scrambler seed 610 and the least significant bit (LSB) corresponds to a reserved bit 614.

In another embodiment, the service field 606 has another suitable length of more than one byte. In another embodiment, the service field 606 has another suitable length of less than one byte. One or more bits of the service field 606 are utilized as a scrambler seed field. In some embodiments, a suitable number of bits of the scrambler seed 608 are fixed to a logic value, such as one (1).

Generating a data unit with an eight bit service field results in a data unit with an amount of PHY protocol information (as opposed to payload data) that is considerably less than the amount of PHY protocol information in prior art physical layer (PHY) formats. This is especially useful in at least some embodiments of long range communication protocols, such as protocols of the IEEE 802.11 ah/af standards. By reducing the amount of PHY overhead data, more of the PHY data unit can be devoted to payload information, and overall data throughput is increased, at least in some embodiments and/or scenarios. As discussed above, in some envisioned uses of long range communication protocols, a size of a PHY service data unit (PSDU) may commonly be on the order of ten bytes. In one example scenario of a long range communication protocol that generally corresponds to a short range PHY data unit but with data repeated four times (4× repetition mode), a sixteen bit service field could occupy as many as three OFDM symbols, which may be a significant portion of the overall PHY data unit.

In some embodiments, the long range protocol operates in at least two modes including (i) a normal or regular mode and (ii) an extended range or low rate mode. The low rate mode may correspond to a slower clock rate as compared to the regular mode, and thus data rates in the low rate mode are generally lower than data rates in the regular mode, in some embodiments. In an embodiment, the PHY data unit format 600 is utilized in both the regular mode and the low rate mode. In another embodiment, the PHY data unit format 600 is utilized in the low rate mode, whereas another suitable PHY data unit format 600 is utilized in the regular mode. For example, in an embodiment, a PHY data unit format with a longer service field (as compared to the PHY data unit format 600), such as a 16-bit service field, is utilized in the regular mode.

Figure 7:
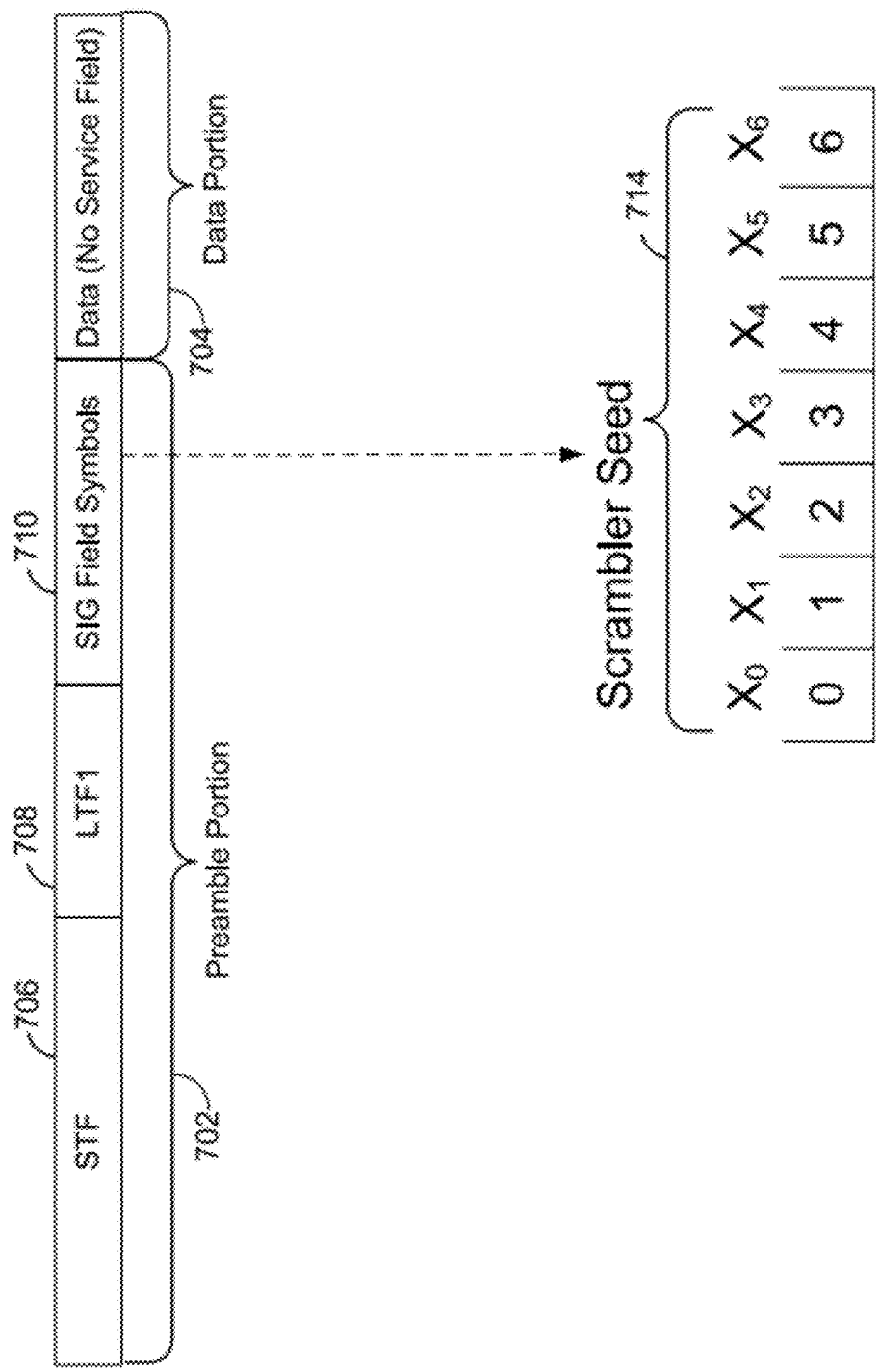
FIG. 7 is a diagram of an example long range PHY data unit, according to another embodiment.

FIG. 7 is a diagram of another example PHY data unit format 700 for use in a long range communication protocol, according to an embodiment. The AP 14 is configured to transmit the PHY data unit 700 to the client station 25-4 via orthogonal frequency division multiplexing (OFDM) modulation, according to an embodiment. In an embodiment, the client station 25-4 is also configured to transmit the data unit 700 to the AP 14.

The data unit 700 includes a preamble portion 702 and a data portion 704. The preamble portion 702 includes a short training field (STF) 706, and a long training field (LTF) 708. The preamble portion 702 also includes a signal field (SIG) 710, used to carry certain physical layer (PHY) parameters associated with the data unit 700, such as modulation type and coding rate used to transmit the data unit 700, for example.

The data portion 704 omits scrambler seed field. In an embodiment, the data portion 704 omits a service field, unlike the IEEE 802.11a, g, n Standards, for example.

In an embodiment, a scrambler seed subfield 714 is included in the signal field 710. In an embodiment, the scrambler seed subfield 714 has a length of seven bits (i.e., $X_0 \ldots X_6$).

In another embodiment, scrambler seed subfield 714 has a length of less than seven bits. In an embodiment, when the scrambler seed subfield 714 has a length of less than seven bits (i.e., N bits, where $1 \leq N < 7$), the scrambler seed subfield 714 represents the N LSBs of a scrambler seed having a length of M, where $M \geq 7$. In an embodiment, stations that operate according to the long range protocol assume that the M-N remaining bits of the scrambler seed are set to a certain value, such as all ones, all zeros, etc.

In an embodiment, the scrambler seed subfield 714 has a length of four bits and corresponds to the four LSBs of a 7-bit scrambler seed. In an embodiment, the remaining three most significant bits (MSB) are assumed to be all ones. Such a scrambler seed meets the randomization requirements of the IEEE 802.11a,g,n Standards, which require the initial scrambler seed value to be a pseudo random non-zero value.

Figure 8:
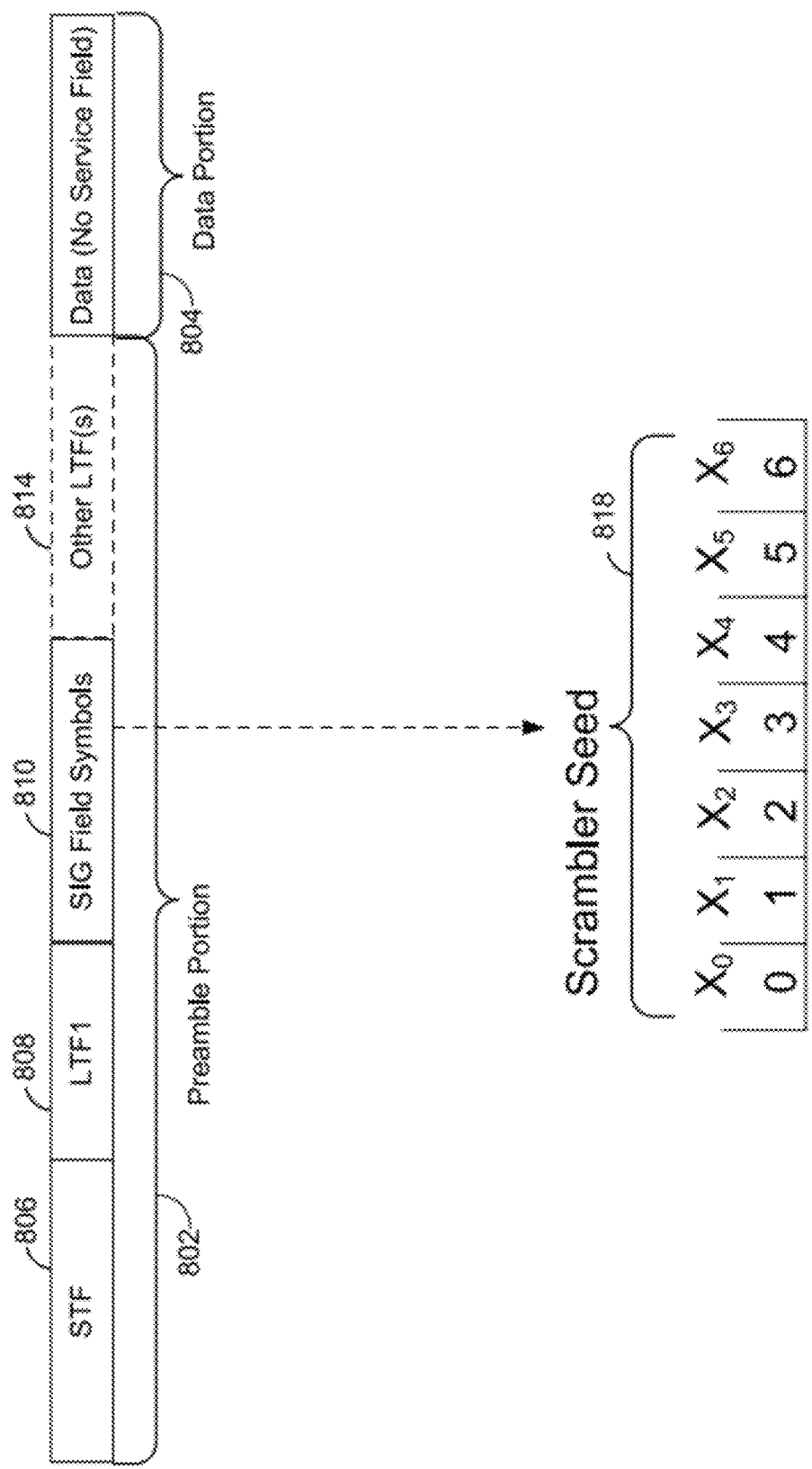
FIG. 8 is a diagram of an example long range PHY data unit, according to another embodiment.

FIG. 8 is a diagram of another example PHY data unit format 800 for use in a long range communication protocol, according to an embodiment. The AP 14 is configured to transmit the PHY data unit 800 to the client station 25-4 via orthogonal frequency division multiplexing (OFDM) modulation, according to an embodiment. In an embodiment, the client station 25-4 is also configured to transmit the data unit 800 to the AP 14.

The data unit 800 includes a preamble portion 802 and a data portion 804. The preamble portion 802 includes a short training field (STF) 806, and a long training field (LTF) 808. In an embodiment, the STF 806 is shorter in duration than the STF 706 (FIG. 7). The preamble portion 702 also includes a signal field (SIG) 810, used to carry certain physical layer (PHY) parameters associated with the data unit 800, such as modulation type and coding rate used to transmit the data unit 800, for example. The data unit also includes other LTFs 814, at least in some scenarios.

The data portion 804 omits scrambler seed field. In an embodiment, the data portion 804 omits a service field, unlike the IEEE 802.11a, g, n Standards, for example.

In an embodiment, a scrambler seed subfield 818 is included in the signal field 810. In an embodiment, the scrambler seed subfield 818 has a length of seven bits (i.e., $X_0 \ldots X_6$).

In another embodiment, the scrambler seed subfield 818 has a length of less than seven bits. In an embodiment, when the scrambler seed subfield 818 has a length of less than seven bits (i.e., N bits, where $1 \leq N < 7$), the scrambler seed subfield 818 represents the N LSBs of a scrambler seed having a length of M, where $M \geq 7$. In an embodiment, stations that operate according to the long range protocol assume that the M-N remaining bits of the scrambler seed are set to a certain value, such as all ones, all zeros, etc.

In an embodiment, the scrambler seed subfield 818 has a length of four bits and corresponds to the four LSBs of a 7-bit scrambler seed. In an embodiment, the remaining three most significant bits (MSB) are assumed to be all ones. Such a scrambler seed meets the randomization requirements of the IEEE 802.11a,g,n Standards, which require the initial scrambler seed value to be a pseudo random non-zero value.

In an embodiment, the PHY data unit format 800 is utilized in the regular mode of the long range protocol, whereas the PHY data unit format 700 (FIG. 7) is utilized in the low rate mode. In another embodiment, the PHY data unit format 700 (FIG. 7) is utilized in the low rate mode, whereas another suitable PHY data unit format 600 is utilized in the regular mode. For example, in an embodiment, a PHY data unit format with a longer service field (as compared to the PHY data unit format 700), such as a 16-bit service field, is utilized in the regular mode.

Figure 9:
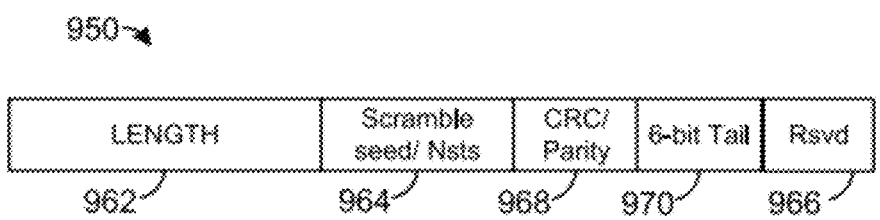
FIG. 9 is a diagram of an example long range PHY data unit, according to another embodiment.

FIG. 9 is a diagram of an example signal field 950 included in a PHY data unit, according to an embodiment. In an embodiment, the signal field 950 is utilized as the signal field 710 of the PHY data unit 700 (FIG. 7). In an embodiment, the signal field 950 is utilized as the signal field 810 of the PHY data unit 800 (FIG. 8). In other embodiments, the signal field 950 is utilized in other suitable PHY data units.

The signal field 950 includes a Length subfield 962, a Scrambler seed/Nsts subfield 964, a Reserved subfield 966, a cyclic redundancy check (CRC)/Parity check subfield 968, and a Tail subfield 970. In an embodiment, the Scrambler seed/Nsts subfield 964 has a length of four bits. In other embodiments, the subfield 964 has another suitable length.

In an embodiment, a value equal to a first value (e.g., a value equal to zero) in the Length field 962 indicates that the packet is a null data packet (NDP) sounding packet. In this case, the Scrambler seed/Nsts subfield 964 is not needed to indicate a value of the scrambler seed because there is no payload portion of the PHY data unit to be scrambled. In an embodiment, when the Length field 962 is set to the first value (e.g., zero), the Scrambler seed/Nsts subfield 964 is interpreted to correspond to a number of spatial streams utilized to transmit the NDP sounding packet, whereas when the Length field 962 is not equal to the first value, the Scrambler seed/Nsts subfield 964 is interpreted to correspond to the N LSBs of the M-bit scrambler seed.

For example, in an embodiment in which four bits are allocated for the Scrambler seed/Nsts subfield 964, when the Length field 962 is set to the first value (e.g., zero), the two LSBs of the Scrambler seed/Nsts subfield 964 are interpreted as the number of spatial streams (Nsts) and the 2 MSBs are reserved. On the other hand, when the Length field 962 is not equal to the first value, the four bits of the Scrambler seed/Nsts subfield 964 are interpreted as the four LSBs of the scrambler seed, and the 3 MSBs of the scrambler seed are assumed to be all ones, all zeros, or some other suitable value.

In an embodiment, the signal field 950 is included in a preamble portion of a PITY data unit. In an embodiment in which at least the signal field 950 is modulated using binary phase shift keying (BPSK), encoded with a binary convolutional code (BCC) of rate ½, each bit is repeated four times, the Length field 962 has a length of eight bits, the Scrambler seed/Nsts subfield 964 has a length of four bits, and the tail field 970 has a length of six bits, the 18 bits of the Length field 962, Scrambler seed/Nsts subfield 964, and the tail field 970 occupies three OFDM symbols.

Figure 10:
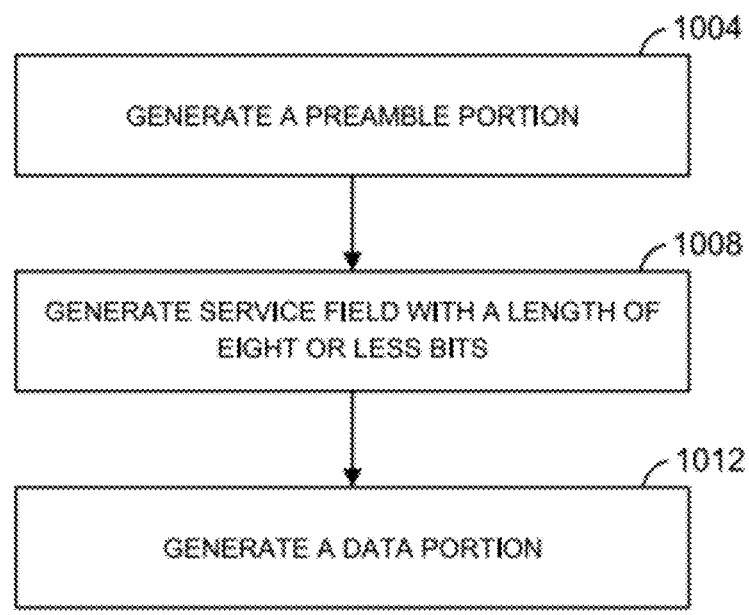
FIG. 10 is a flow diagram of an example method for generating a PHY data unit, according to an embodiment.

FIG. 10 is a flow diagram of an example method 1000 for generating a PHY data unit according to a long range communication protocol, according to an embodiment. With reference to FIG. 1, the method 1000 is implemented by the network interface 16 of the AP 14. In one such embodiment, the PHY processing unit 20 is configured to implement the method 1000. According to another embodiment, the MAC processing 18 is also configured to implement at least a part of the method 1000. With continued reference to FIG. 1, in yet another embodiment, the method 1000 is implemented by the network interface 27 (e.g., the PHY processing unit 29 and/or the MAC processing unit 28) of the client station 25-1. In other embodiments, the method 1000 is implemented by other suitable network interfaces.

At block 1002, a preamble portion of the PHY data unit is generated. For example, in one embodiment, the preamble portion 602 of FIG. 6 is generated. In other embodiments, another suitable PHY data unit preamble is generated. In an embodiment, the preamble portion 602 is generated according to a long range communication protocol.

At block 1008, a service field is generated, where the service field has a length of eight bits or less. In an embodiment, seven bits of the service field are defined as a scrambler seed, and one bit of the service field is defined as reserved. In other embodiments, (i) the service field has a length of less than eight bits (e.g., 1, 2, 3, 4, 5, 6 or 7 bits), (ii) less than seven bits of the service field are defined as the scrambler seed (e.g., 1, 2, 3, 4, 5 or 6 bits), and/or (iii) the remaining zero or more bits are defined as reserved. In an embodiment, the service field generated at block 1008 is the service field 606 of FIG. 6.

At block 1012, a data portion of the of the PHY data unit is generated to include the service field generated at block 1008. For example, in one embodiment, the data portion 604 of FIG. 6 is generated. In other embodiments, another suitable PHY data unit data portion is generated. In an embodiment, the data portion is generated according to a long range communication protocol. In an embodiment, the data portion is generated using the scrambler seed information in the service field. In an embodiment, when the service field includes less than seven bits of scrambler seed information, generating the data portion includes assuming that one or more other bits of a scrambler seed are a predefined value.

Figure 11:
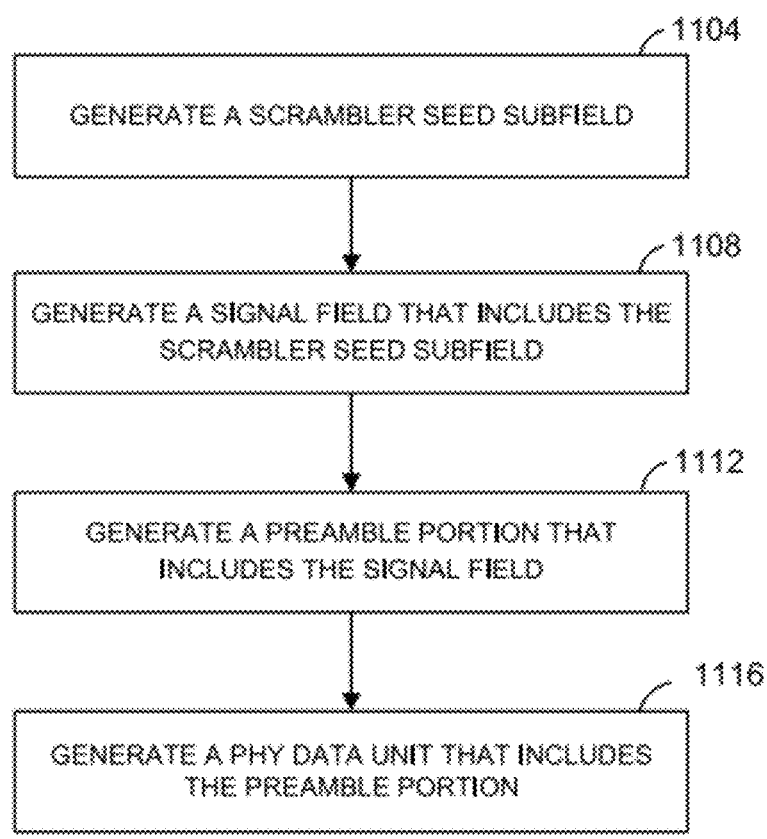
FIG. 11 is a flow diagram of an example method for generating a PHY data unit, according to another embodiment.

FIG. 11 is a flow diagram of another example method 1100 for generating a PHY data unit according to a long range communication protocol, according to an embodiment. With reference to FIG. 1, the method 1100 is implemented by the network interface 16 of the AP 14. In one such embodiment, the PHY processing unit 20 is configured to implement the method 1100. According to another embodiment, the MAC processing 18 is also configured to implement at least a part of the method 1100. With continued reference to FIG. 1, in yet another embodiment, the method 1100 is implemented by the network interface 27 (e.g., the PHY processing unit 29 and/or the MAC processing unit 28) of the client station 25-1. In other embodiments, the method 1100 is implemented by other suitable network interfaces.

At block 1104, a scrambler seed subfield is generated. In an embodiment, the scrambler seed subfield includes a full scrambler seed value (e.g., all bits of the scrambler seed value) used for scrambling data to be included in a PHY data unit. In another embodiment, the scrambler seed subfield includes only a portion of the full scrambler seed value used for scrambling data to be included in a PHY data unit. For example, in embodiments in which the full scrambler seed value has a length of seven bits, the scrambler seed subfield includes only a portion of the seven bits of the full scrambler seed value (e.g., six bits, five bits, four bits, three bits, two bits, or one bit). In embodiments in which the scrambler seed subfield includes only a portion of the full scrambler seed value, the scrambler seed subfield corresponds to the LSBs of the full scrambler seed value, and the MSBs are assumed to be a predefined value such as all ones, all zeros, or some other suitable value. In another embodiment in which the scrambler seed subfield includes only a portion of the full scrambler seed value, the scrambler seed subfield corresponds to the MSBs of the full scrambler seed value, and the LSBs are assumed to be a predefined value such as all ones, all zeros, or some other suitable value.

In an embodiment, the scrambler seed subfield is generated as discussed with regard to the example scrambler seed subfield 714 of FIG. 7. In an embodiment, the scrambler seed subfield is generated as discussed with regard to the example scrambler seed subfield 818 of FIG. 8. In an embodiment, the scrambler seed subfield is generated as discussed with regard to the example scrambler seed subfield 964 of FIG. 9.

At block 1108, a signal field of PHY data unit preamble is generated to include the scrambler seed subfield generated at block 1104. In an embodiment, the signal field is generated as discussed with regard to the example signal field 710 of FIG. 7. In an embodiment, the signal field is generated as discussed with regard to the example signal field 810 of FIG. 8. In an embodiment, the signal field is generated as discussed with regard to the example signal field 950 of FIG. 9.

At block 1112, a PHY data unit preamble of a PHY data unit is generated to include the signal field generated at block 1108. In an embodiment, the preamble is generated as discussed with regard to the example preamble portion 702 of FIG. 7. In an embodiment, the preamble is generated as discussed with regard to the example preamble portion 802 of FIG. 8.

At block 1116, a PHY data unit is generated to include the preamble generated at block 1112. In an embodiment, the PHY data unit is generated as discussed with regard to the example PHY data unit 700 of FIG. 7. In an embodiment, the PHY data unit is generated as discussed with regard to the example PHY data unit 800 of FIG. 8. In an embodiment, the PHY data unit generated at block 1116 includes a data portion, and bits in the data portion are scrambled using a scrambler seed value corresponding to the scrambler seed subfield generated at block 1104.

Figure 12:
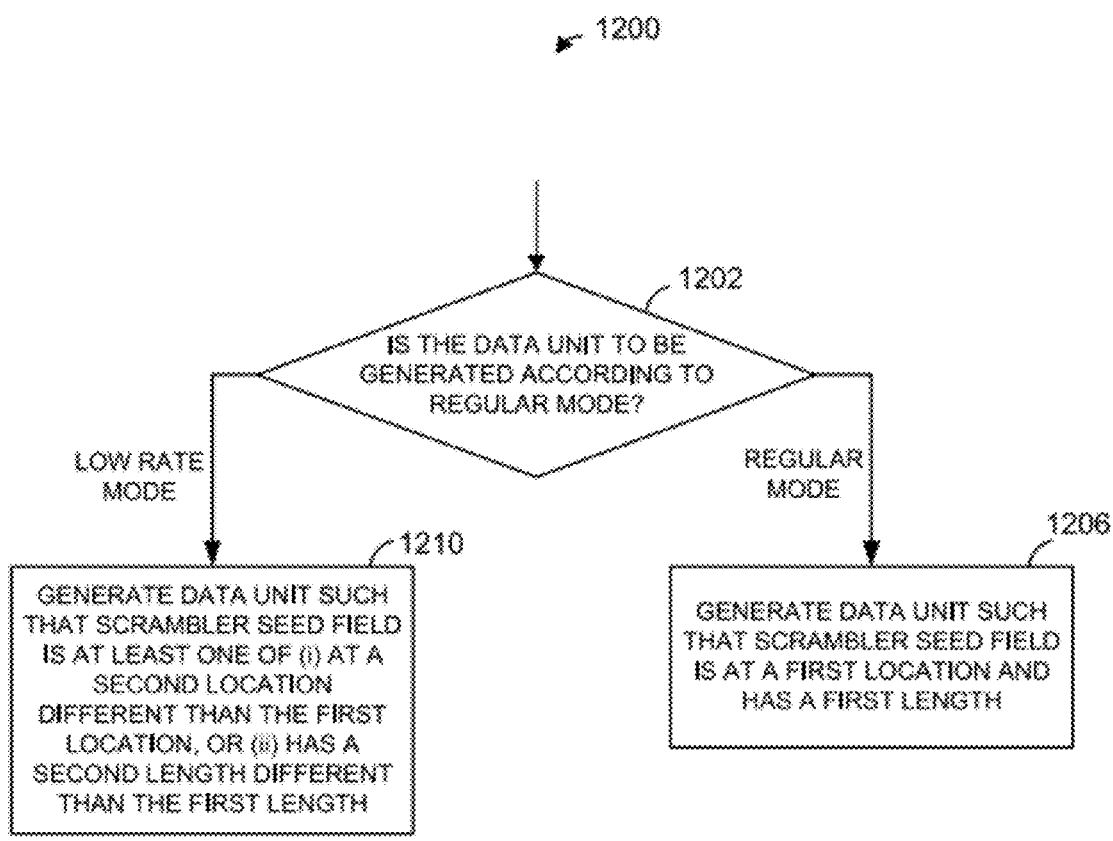
FIG. 12 is a flow diagram of another example method for generating a PHY data unit, according to another embodiment.

FIG. 12 is a flow diagram of an example method 1200 for generating a PHY data unit according to a long range communication protocol, according to an embodiment. With reference to FIG. 1, the method 1200 is implemented by the network interface 16 of the AP 14, in an embodiment. For example, in one such embodiment, the PHY processing unit 20 is configured to implement the method 1200. According to another embodiment, the MAC processing 18 is also configured to implement at least a part of the method 1200. With continued reference to FIG. 1, in yet another embodiment, the method 1200 is implemented by the network interface 27 (e.g., the PHY processing unit 29 and/or the MAC processing unit 28) of the client station 25-1. In other embodiments, the method 1200 is implemented by other suitable network interfaces.

At block 1202, it is determined whether the PHY data unit is to be generated according to (i) a regular mode of the long range protocol or (ii) a low rate mode of the long range protocol. If it is determined at block 1202 that the PHY data unit is to be generated according to the regular mode, then the PHY data unit is generated according to a first data unit format at block 1206. In an embodiment, block 1206 includes generating the PHY data unit such that a scrambler seed field (i) is at a first location in the PHY data unit and (ii) has a first length.

On the other hand, if it is determined at block 1202 that the PITY data unit is to be generated according to the low rate mode, then the PHY data unit is generated according to a second data unit format at block 1210. In an embodiment, block 1210 includes generating the PHY data unit such that the scrambler seed field is at least one of (i) at a second location in the PHY data unit different than the first location, and (ii) has a second length different than the first length.

For example, in an embodiment, when the PHY data unit is generated according to the regular mode, the scrambler seed subfield is located in a service field of a payload portion of the PHY data unit, whereas when the PHY data unit is generated according to the low rate mode, the service field is omitted from the payload portion of the PHY data unit and the scrambler seed subfield is located in a signal field of a preamble portion of the PHY data unit. As another example, in an embodiment, when the PHY data unit is generated according to the regular mode, the scrambler seed subfield has a length equal to a length of a full scrambler seed value, whereas when the PHY data unit is generated according to the low rate mode, the scrambler seed subfield has a length that is less than a length of a full scrambler seed value. As another example, in an embodiment, when the PHY data unit is generated according to the regular mode, (i) the scrambler seed subfield is located in a service field of a payload portion of the PHY data unit and (ii) the scrambler seed subfield has a length equal to a length of a full scrambler seed value, whereas when the PHY data unit is generated according to the low rate mode, (i) the service field is omitted from the payload portion of the PHY data unit and the scrambler seed subfield is located in a signal field of a preamble portion of the PHY data unit and (ii) the scrambler seed subfield has a length that is less than a length of a full scrambler seed value.

Figure 13:
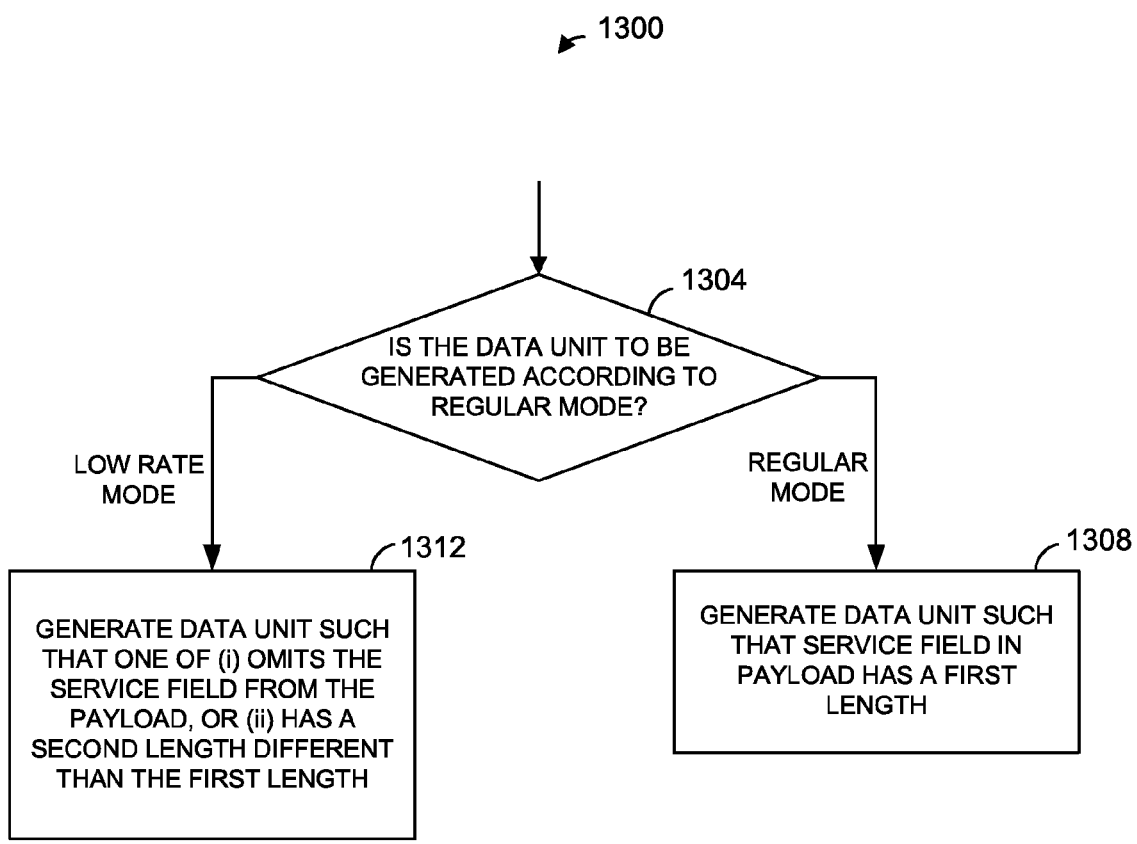
FIG. 13 is a flow diagram of another example method for generating a PHY data unit, according to another embodiment.

FIG. 13 is a flow diagram of an example method 1300 for generating a PHY data unit according to a long range communication protocol, according to an embodiment. With reference to FIG. 1, the method 1300 is implemented by the network interface 16 of the AP 14, in an embodiment. For example, in one such embodiment, the PHY processing unit 20 is configured to implement the method 1300. According to another embodiment, the MAC processing 18 is also configured to implement at least a part of the method 1200. With continued reference to FIG. 1, in yet another embodiment, the method 1300 is implemented by the network interface 27 (e.g., the PHY processing unit 29 and/or the MAC processing unit 28) of the client station 25-1. In other embodiments, the method 1300 is implemented by other suitable network interfaces.

At block 1304, it is determined whether the PHY data unit is to be generated according to (i) a regular mode of the long range protocol or (ii) a low rate mode of the long range protocol. If it is determined at block 1304 that the PHY data unit is to be generated according to the regular mode, then the PHY data unit is generated according to a first data unit format at block 1308. In an embodiment, block 1308 includes generating the PHY data unit such that a service field (i) is located in a payload portion of the PHY data unit and (ii) has a first length.

On the other hand, if it is determined at block 1304 that the PITY data unit is to be generated according to the low rate mode, then the PHY data unit is generated according to a second data unit format at block 1312. In an embodiment, block 1312 includes generating the PHY data unit such that (i) the service field is omitted from the payload portion, or (ii) has a second length different than the first length.

For example, in an embodiment, when the PHY data unit is generated according to the regular mode, the service field (including a scrambler seed subfield) is included in the payload portion of the PHY data unit, whereas when the PHY data unit is generated according to the low rate mode, the service field is omitted from the payload portion of the PHY data unit and the scrambler seed subfield is located in a signal field of a preamble portion of the PHY data unit. As another example, in an embodiment, when the PHY data unit is generated according to the regular mode, the service field has a first length and is included in the payload portion of the PHY data unit, whereas when the PHY data unit is generated according to the low rate mode, the service field has a second length and is included in the payload portion of the PHY data unit. In an embodiment, the second length is shorter than the first length.

In an embodiment, an apparatus includes a network interface configured to implement the method 1300.

At least some of the various blocks, operations, and techniques described above may be implemented utilizing hardware, a processor executing firmware instructions, a processor executing software instructions, or any combination thereof. Also, some of the various blocks, operations, and techniques may be performed in a different order (and/or concurrently) and still achieve desirable results. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism. Also, software or firmware instructions may be delivered to a user or a system via a communication channel such as a telephone line, a DSL line, a cable television line, a fiber optics line, a wireless communication channel, the Internet, etc. The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While various aspects of the present disclosure have been described with reference to specific examples, which are intended to be illustrative only and not to be limiting, changes, additions and/or deletions may be made to the disclosed embodiments without departing from the scope of the claims.

What is claimed is:

1. A method for generating a physical layer (PHY) data unit for transmission via a long range communication protocol, the method comprising:
   determining whether the PHY data unit is to be generated according to a first mode of operation or a second mode of operation; and
   when it is determined that the PHY data unit is to be generated according to the first mode of operation, generating the PHY data unit such that a scrambler seed subfield (i) is included in a service field of a data portion of the PHY data unit and (ii) has a first length;
   when it is determined that the PHY data unit is to be generated according to the second mode of operation, generating the PHY data unit such that the scrambler seed subfield is included in a signal field of a preamble portion of the PHY data unit, and at least one of
      (i) the scrambler seed subfield is excluded from the service field of the data portion of the PHY data unit, and
      (ii) the scrambler seed subfield has a second length different than the first length.

2. The method of claim 1, wherein generating the PHY data unit such that the scrambler seed subfield has the second length different than the first length comprises generating the PHY data unit such that the second length of the scrambler seed is less than the first length of the scrambler seed.

3. An apparatus comprising:
   a network interface configured to generate a physical layer (PHY) data unit according to a long range communication protocol at least by
      determining whether the PHY data unit is to be generated according to a first mode of operation or a second mode of operation, and
      when it is determined that the PHY data unit is to be generated according to the first mode of operation, generating the PHY data unit such that a scrambler seed subfield (i) is included in a service field of a data portion of the PHY data unit and (ii) has a first length;
      when it is determined that the PHY data unit is to be generated according to the second mode of operation, generating the PHY data unit such that the scrambler seed subfield is included in a signal field of a preamble portion of the PHY data unit, and at least one of
(i) the scrambler seed subfield is excluded from the service field of the data portion of the PHY data unit, and
(ii) the scrambler seed subfield has a second length different than the first length.

4. The apparatus of claim 3, wherein the network interface is configured to, when generating the PHY data unit such that the scrambler seed subfield has the second length different than the first length, generate the PHY data unit such that the second length of the seed is less than the first length of the scrambler seed.

5. The apparatus of claim 3, wherein the network interface is configured to:
when it is determined that the PHY data unit is to be generated according to the first mode of operation, generating the PHY data unit such that the scrambler seed subfield is in a service field of a data portion of the PHY data unit; and
when it is determined that the PHY data unit is to be generated according to the second mode of operation, generating the PHY data unit such that the scrambler seed subfield is in a signal field of a preamble portion of the PHY data unit.

6. A method for generating a physical layer (PHY) data unit for transmission via a long range communication protocol, the method comprising:
determining whether the PHY data unit is to be generated according to a first mode of operation or a second mode of operation; and
when it is determined that the PHY data unit is to be generated according to the first mode of operation, generating the PHY data unit such that a scrambler seed subfield (i) is included at a first location in the PHY data unit and (ii) has a first length;
when it is determined that the PHY data unit is to be generated according to the second mode of operation, generating the PHY data unit such that at least one of
(i) the scrambler seed subfield is (a) included at a second location in the PHY data unit different than the first location, (b) excluded from the first location in the PHY data unit, and (c) the scrambler seed subfield has a second length shorter than the first length of the scrambler seed subfield, and
(ii) the scrambler seed subfield has a second length shorter than the first length of the scrambler seed subfield.

7. The method of claim 6, wherein:
when it is determined that the PHY data unit is to be generated according to the first mode of operation, generating the PHY data unit such that the scrambler seed subfield is in a service field of a data portion of the PHY data unit; and
when it is determined that the PHY data unit is to be generated according to the second mode of operation, generating the PHY data unit such that the scrambler seed subfield is in a signal field of a preamble portion of the PHY data unit.

8. An apparatus comprising:
a network interface configured to generate a physical layer (PHY) data unit according to a long range communication protocol at least by
determining whether the PHY data unit is to be generated according to a first mode of operation or a second mode of operation, and
when it is determined that the PHY data unit is to be generated according to the first mode of operation, generating the PHY data unit such that a scrambler seed subfield (i) is included at a first location in the PHY data unit and (ii) has a first length;
when it is determined that the PHY data unit is to be generated according to the second mode of operation, generating the PHY data unit such that at least one of
(i) the scrambler seed subfield is (a) included at a second location in the PHY data unit different than the first location, (b) excluded from the first location in the PHY data unit, and (c) the scrambler seed subfield has a second length shorter than the first length of the scrambler seed subfield, and
(ii) the scrambler seed subfield has a second length shorter than the first length of the scrambler seed subfield.

* * * * *